(12) United States Patent  (10) Patent No.: US 8,267,462 B2
Bogdan  (45) Date of Patent: Sep. 18, 2012

(54) VERSATILE VEHICLE BODY PROTECTOR AND METHOD OF USING SAME

(76) Inventor: Gieorgii Bogdan, Brooklyn, NY (US)

( * ) Notice: Subject to any disclaimer, the term of this patent is extended or adjusted under 35 U.S.C. 154(b) by 56 days.

(21) Appl. No.: 12/181,719

(22) Filed: Jul. 29, 2008

(65) Prior Publication Data

US 2009/0026775 A1  Jan. 29, 2009

Related U.S. Application Data

(60) Provisional application No. 60/952,580, filed on Jul. 29, 2007.

(51) Int. Cl.
    *B60J 7/20* (2006.01)
(52) U.S. Cl. ............... 296/136.02; 293/117; 293/142
(58) Field of Classification Search .......... 296/187.03, 296/136.02, 187.07, 207, 118, 136.01, 136.07, 296/136.08, 136.1, 136.03; 293/102, 117, 293/128, 142; 362/496; 428/31
    See application file for complete search history.

(56) References Cited

U.S. PATENT DOCUMENTS

| | | | | | |
|---|---|---|---|---|---|
| 1,647,014 | A | * | 10/1927 | Pattison | 293/117 |
| 1,780,061 | A | * | 10/1930 | Bluff | 40/591 |
| 2,201,002 | A | * | 5/1940 | Theriault | 40/591 |
| 2,599,047 | A | * | 6/1952 | Clark | 335/285 |
| 2,690,928 | A | * | 10/1954 | Boynes | 296/95.1 |
| 2,730,396 | A | * | 1/1956 | Johnson | 293/142 |
| 2,875,945 | A | * | 3/1959 | Wittelshofer | 150/166 |
| 3,718,357 | A | * | 2/1973 | Hertzell | 293/9 |
| 3,981,521 | A | * | 9/1976 | See | 280/760 |
| 4,183,573 | A | * | 1/1980 | DeRidder | 296/166 |
| 4,219,218 | A | * | 8/1980 | Waldon | 280/770 |
| 4,221,410 | A | * | 9/1980 | Dawson | 293/21 |
| 4,622,494 | A | * | 11/1986 | Johnson | 315/77 |
| 4,720,135 | A | * | 1/1988 | Farina | 296/136.03 |
| 4,750,767 | A | * | 6/1988 | Barnett | 293/128 |
| 4,775,559 | A | * | 10/1988 | Kanamori | 428/31 |
| 4,796,935 | A | * | 1/1989 | Maraia | 293/128 |
| 4,810,015 | A | * | 3/1989 | McNeil | 293/128 |
| 4,826,713 | A | * | 5/1989 | Cook | 428/31 |
| 4,974,892 | A | * | 12/1990 | Huard | 293/128 |

(Continued)

FOREIGN PATENT DOCUMENTS

KR  2001063421 A  *  7/2001

OTHER PUBLICATIONS

BUMPERPAD.com/Products.html—products, Bumper Blocker, Web-page printout, Printed Jul. 31, 2008, 2 pages.

(Continued)

*Primary Examiner* — Glenn Dayoan
*Assistant Examiner* — Pinel Romain
(74) *Attorney, Agent, or Firm* — Alexey Bakman, Esq.

(57) ABSTRACT

A vehicle body protector of the present invention comprises one or more section, with each of the sections comprising one or more layers of compressible rubbery substance. Each section also comprises a face side, an attachment side, and a holder. The holder is intended for securing one or more sections to the body of a vehicle. At least one of the sections is shaped in the form of a raised visually-recognizable symbol. The method of simultaneously advertising and protecting the vehicle's surface from bumps and scratches, utilizing the vehicle body protector of the present invention is also described and claimed.

13 Claims, 5 Drawing Sheets

U.S. PATENT DOCUMENTS

| | | | | |
|---|---|---|---|---|
| 4,991,891 | A * | 2/1991 | Karshens | 293/128 |
| 5,050,925 | A * | 9/1991 | Brown | 296/136.03 |
| 5,072,979 | A * | 12/1991 | Swinton | 293/128 |
| D323,639 | S * | 2/1992 | Creamer | D12/401 |
| 5,129,678 | A * | 7/1992 | Gurbacki | 280/770 |
| 5,129,695 | A * | 7/1992 | Norman, II | 293/128 |
| 5,139,304 | A * | 8/1992 | Tajiri | 293/117 |
| 5,195,778 | A * | 3/1993 | Dismuke | 280/770 |
| D335,271 | S * | 5/1993 | Davis | D12/167 |
| 5,255,464 | A * | 10/1993 | Marecek | 40/591 |
| 5,286,536 | A * | 2/1994 | Gross et al. | 428/31 |
| 5,497,303 | A * | 3/1996 | Decinti et al. | 362/505 |
| 5,518,283 | A * | 5/1996 | Egelske | 293/128 |
| 5,618,073 | A * | 4/1997 | Criscione | 293/142 |
| 5,673,960 | A * | 10/1997 | Sorensen | 296/136.07 |
| 5,799,992 | A * | 9/1998 | Kojima | 293/128 |
| 5,893,226 | A * | 4/1999 | Sophocleous et al. | 40/591 |
| 5,938,263 | A * | 8/1999 | Barthelman | 296/37.6 |
| 5,944,372 | A * | 8/1999 | Gilbert | 296/37.6 |
| 5,946,095 | A * | 8/1999 | Henningsen et al. | 356/519 |
| 5,956,918 | A * | 9/1999 | Wise | 52/716.5 |
| 5,975,599 | A * | 11/1999 | Goldstein | 293/128 |
| 6,247,742 | B1 * | 6/2001 | Boudreaux | 296/57.1 |
| 6,254,170 | B1 * | 7/2001 | Farmer et al. | 296/136.07 |
| 6,461,028 | B1 * | 10/2002 | Huang | 362/505 |
| 6,484,427 | B1 * | 11/2002 | Santa Cruz et al. | 40/591 |
| 6,572,086 | B2 * | 6/2003 | Kelly | 267/136 |
| 6,769,725 | B2 * | 8/2004 | Ko | 293/128 |
| 6,789,833 | B1 * | 9/2004 | Alber | 296/57.1 |
| 6,893,079 | B1 * | 5/2005 | Johnson et al. | 296/187.12 |
| 7,083,211 | B1 * | 8/2006 | Bores | 296/1.08 |
| 7,090,266 | B1 * | 8/2006 | Price | 293/128 |
| 7,108,411 | B2 * | 9/2006 | Pommeret et al. | 362/496 |
| 7,229,108 | B2 * | 6/2007 | Hochrein | 293/128 |
| 7,258,472 | B2 * | 8/2007 | Tufte | 362/505 |
| 7,354,083 | B1 * | 4/2008 | Obermann | 293/128 |
| 7,374,214 | B2 * | 5/2008 | Debs | 293/128 |
| 7,401,949 | B2 * | 7/2008 | Tufte | 362/369 |
| 7,527,320 | B1 * | 5/2009 | Nevell, Jr. | 293/102 |
| 7,680,570 | B2 * | 3/2010 | Mori | 701/28 |
| 2002/0105416 | A1 * | 8/2002 | Kore | 340/425.5 |
| 2003/0057729 | A1 * | 3/2003 | Morris | 296/136 |
| 2004/0095739 | A1 * | 5/2004 | Parker et al. | 362/26 |
| 2005/0028912 | A1 * | 2/2005 | Schnarr | 150/166 |
| 2006/0250230 | A1 * | 11/2006 | Fischer et al. | 340/500 |
| 2008/0017426 | A1 * | 1/2008 | Walters et al. | 180/65.2 |
| 2008/0037007 | A1 * | 2/2008 | Kitano | 356/73 |

OTHER PUBLICATIONS http://www.chariotauto.com/_wsn/page2.html, The Bumper Badger, Web-page printout, Printed Jul. 31, 2008, 2 pages.
BUMPERPAD.com/Bumper Protection Products.html, BumperBully, Web-page printout, Printed Aug. 1, 2008, 2 pages.

* cited by examiner

VERSATILE VEHICLE BODY PROTECTOR AND METHOD OF USING SAME

This application claims priority to provisional application No. 60/952,580, filed on Jul. 29, 2007.

FIELD OF THE INVENTION

The field of this invention is automobile body protectors, and more particularly a body protector, comprising one or more graphic symbols.

BACKGROUND OF THE INVENTION

As population of our nation continues to grow, so does the number of cars on the streets of our cities. But the streets themselves change little with time. The number of parking spots in the cities can hardly keep up with the number of cars. This leads to the parking havoc well known to residents of such metropolitan areas, as New York City. Sometimes it takes hours of searching to find a parking spot, only to realize that it is either too small, or barely sufficient for one's car. In either case, it usually takes some attempts and some bumper-bumping to figure out whether one's car will fit.

The bumpers of many old cars were intended for bumping. They were often the strongest part of the car, designed to bear out a collision, thus reducing the damage to the body of the car. However, safety, as well as marketing considerations of recent decades created a trend of weakening, or eliminating bumpers entirely, instead opting to maximize the damage to the car in order to redistribute the effects of collisions throughout the body of the vehicle. The absence or weakening of bumpers, while arguably beneficial for catastrophic high-speed collisions, has greatly reduced the ability of modern cars to deal with minor bumps and collisions.

The bumpers of most modern cars are fragile and are hardly adopted for metropolitan in-line parking. The bumpers usually form an integral part of the car and are often intended to be more of design than utilitarian elements. The surface of the bumpers is usually covered with a layer of the same paint as the body of the car and scratches and dents just as easily. These scratches and dents are impossible to avoid even if the driver is extra-careful in parking his or her vehicle. As the automobile is left in parallel parking, the neighbor in front or in the back is likely to bump into the car as he moves in or out of his own tight parallel parking spot. Thus, the bumpers of even the most careful new car owners in the city are covered in multitude of dents and scratches within months of buying a car.

Such dents and scratches obviously greatly reduce the value and aesthetic appearance of the car. They are difficult and expensive to repair. Unlike the metal and rubber bumpers of yesteryear, many bumper types can not be flexed into shape once damaged, requiring the replacement of the entire bumper to repair a dent. In other cases, manual removal of all paint and repainting of the entire surface is required to repair scratches. And often, particularly in expensive cars with exotic parts and finishes, the damage can not be repaired alltogether. This state of the industry leads to almost paranoidal fears of bumper scratches, particularly in drivers of the new and leased cars.

The market has responded to the owner's concerns and the vulnerability of the newer cars with several types of bumper protectors. The most popular one, is the rubber-floor-mat-type protector, suspendable over the rear bumper. This protector is intended to be carried in the trunk of the car, and then suspended out of the trunk, and over the bumper prior to parking. However, this type of protector has several major deficiencies. First, the design contemplates that part of the protector remains inside of the trunk, clamped by the trunk door, while another part covers the bumper. Such design effectively prevents positioning of such a protector over the front bumper, as this would require positioning part of the protector under the hood of the car, next to the engine and other moving parts. Clamping of the protector by the trunk door may also prevent the trunk from latching completely, and thus compromise the security of the contents of the trunk. Because of the large surface area, floor-mat bumper protectors take up significant storage space in the trunk. Because of the large surface area, such bumper protectors have to be made of thin rubber or other lightweight material, lest they become too heavy to handle. This limitation on thickness of the bumper protector limits its efficiency. Furthermore, bumper protectors of the mat design are not intended for permanent protection. Rather, they are intended to be attached to the rear bumper prior to parking. Thus, the driver has to exit the car, open the trunk, unfold and position the protector prior to parking. All of this creates major inconveniences. While it is possible to drive with mat bumper protector unfolded, this, in addition to increased fuel consumption, may create hazards for other drivers. For example, at high speed, the mat may disconnect and obstruct the vision of the driver in the car behind. Alternatively, the protector mat, flapping at high speeds under the bumper may raise mud and stones from the road, sending them on the collision course with other cars.

Another type of bumper protector is a rubberized strip protector that can be glued onto the front and rear bumpers of the car. This type of bumper protector is usually embodied as plain black rubber strip or a ribbed rubber strip. Such a protector, reminiscent of the old utilitarian bumper protectors, often greatly detracts from the streamlined design of modern cars. Since such bumper protectors are usually permanently-attached, they continue to be highly visible, and continue to detract from vehicle's visual appearance, even in places and situations where bumper protectors are inappropriate.

Thus, while the above bumper types provide some protection against bumper scratches, they are unsightly (detracting from the original design of the vehicle) and serve no utilitarian purpose other than shielding the bumper. Additionally, such bumper stickers may suggest negative connotations about the character of the vehicle's owner. For example, upon seeing a bumper protector of the type on the market today, one may assume that the owner is over-protective of his property or that one has a leased car and is worried about being charged for bumper scratches.

Furthermore, bumper protectors on the market today take the space of and interfere with the placement of the bumper stickers. For many car owners, bumper stickers present a valuable opportunity to personalize the vehicle, to make a personal statement, to promote a product or belief, and to otherwise communicate with fellow drivers. Bumper stickers are an extremely efficient way of conveying information, particularly the commercial advertisements. Drivers, behind the car with a bumper sticker become captive audience, as they have to look forward at the bumper of the car in front of them. But today, city drivers, can not elect to have personal messages on the bumpers, if they want protection from bumps and scratches. And even if they do not want to attach any bumper stickers, the choice is between a scratched unsightly bumper or the one covered with suspended rugs or plain strips of rubber.

In light of the problems and compromises associated with existing bumper protectors, there is a long-standing and unsatisfied need in the art for a versatile bumper protector that provides reliable protection for the front as well as the rear bumper. The bumper protector should not require constant attention, removal, or attachment prior to parking. The bumper protector should not create a potential for a road hazard and should not compromise the safety of the trunk. At the same time, the bumper sticker must be aesthetically pleasing, consistent with the overall vehicle design, and be capable of expressing personal and commercial statements, if the vehicle owner so desires.

The present invention achieves all of these objectives and provides numerous additional benefits for manufacturers, consumers, and society in general.

SUMMARY OF THE PRESENT INVENTION

The present invention is defined by the following claims and nothing in this section should be taken as a limitation on those claims.

The vehicle body protector of the present invention comprises one or more sections. Each of the sections comprises at least one layer of compressible rubbery substance, a face side, an attachment side, and a holder. The holder is intended for securing the section to the body of a vehicle and may, in preferred embodiments, be a layer of glue or a plurality of brackets, among others. At least one section of the body protector is shaped in the form of a raised visually-recognizable symbol.

In some of the preferred embodiments, one or more sections are shaped in the form of raised visually-recognizable symbol of a company's trademark, such as a car manufacturer's brand. In other preferred embodiments, the symbols are letters, or words, forming personal statements or advertisement slogans.

Some preferred embodiments are described and claimed that comprise light-reflective materials attached to the face side of at least one of the sections. Other embodiments of the vehicle body protector may comprise one or more lamps, a digital camera, a distance meter, a warning alarm and other adaptations.

Methods of advertising and simultaneously protecting the vehicle's surface from bumps and scratches are also described and claimed.

DETAILED DESCRIPTION OF THE PREFERRED EMBODIMENT

Figure 1:
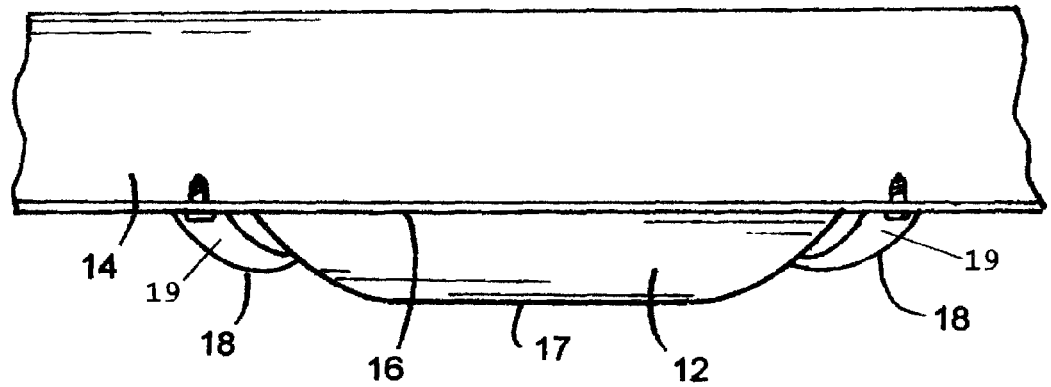
FIG. 1 depicts a view from above of the simple embodiment of the vehicle body protector in the shape of a BMW mark, as shown in FIG. 2. The BMW symbol depicted on the drawing is a registered trademark of Bayerische Motoren Werke; Aktiengesellschaft Aktiengesellschaft (joint stock company), FED REP GERMANY).

The apparatus of the present invention will now be illustrated by reference to the accompanying drawings. Preferred embodiments of the versatile vehicle body protector of the present invention have been assigned reference numeral 10 and are referred to as body protector 10. Since in most embodiments, the body protector 10 will be used for protection of car bumpers from dents and scratches, it is also referred to as bumper protector 10. Other elements have been assigned the reference numerals referred to below.

The body protector 10 comprises at least one, or preferably a plurality of sections 11. Each section 11 is shaped in the form of a raised visually-recognizable symbol or part of such a symbol. Some non-exclusive examples of such symbols are letters of the alphabet, entire words and sentences, graphical logos, etc., or component parts of such letters of the alphabet, entire words and sentences, graphical logos, etc. For example, the body protector may comprise a single section 11, which is shaped as a letter "O." In alternative embodiment, a similarly-looking body protector 10, in the form of the letter "O" may be comprised of two halves shaped as two letters "C," (each being half of the letter "O"), joined together to form the letter "O." In such case, for purposes of this description and the claims, each half forming the letter O is a raised visually-recognizable symbol. In some embodiments, the body protector 10 comprises an entire word, such as the word "AD" on FIG. 2. In this case letters "A" and "D" are two of the sections 11, of the body protector 10.

Figure 2:
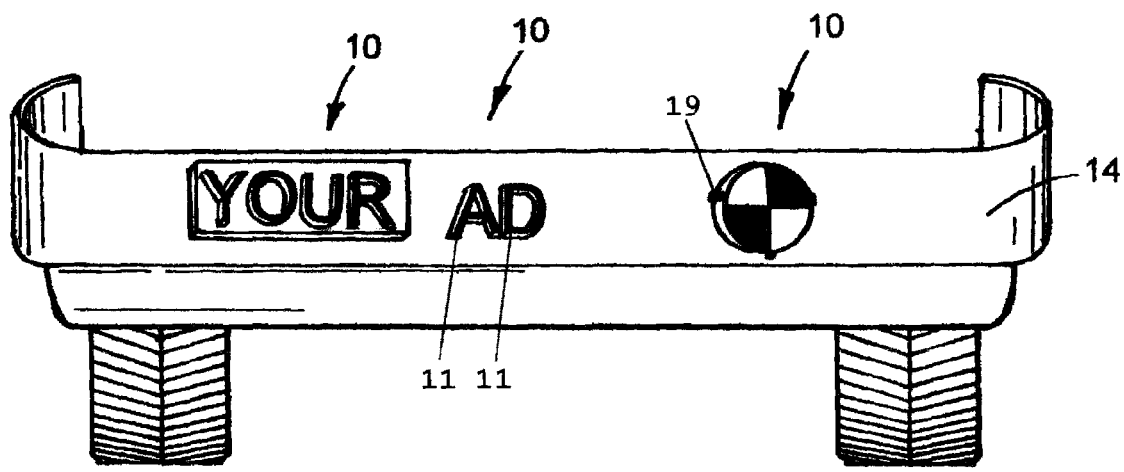
FIG. 2 depicts three out of numerous possible embodiments of the vehicle body protector. Among the embodiments shown are:
(a) the embodiment in the form of a visually-recognizable symbol (a convex BMW mark) on a raised rubbery layer (The BMW symbol depicted on the drawing is a registered trademark of Bayerische Motoren Werke; Aktiengesellschaft Aktiengesellschaft (joint stock company), FED REP GERMANY),
(b) the embodiment that comprises several sections shaped in the form of visually-recognizable three-dimensional symbols or parts of visually-recognizable symbols (two individual letters forming the word "AD"), and
(c) The protector comprising a raised symbol or symbols on the external face of the layer (the layer with raised letters, forming the word "YOUR" on the layer).

The term "raised," as used in the phrase "shaped in the form of a raised visually-recognizable symbol" refers to the fact that the symbol itself raises (as in letters "AD" on FIG. 2) or is (a two or three-dimensional) part of a surface that raises above the surface of the vehicle to protect the vehicle from bumps and scratches (as in BMW mark on FIG. 2).

Each of the sections 11, comprises at least one, and preferably one, layer of compressible rubbery substance 12, also referred to as layer 12. The rubbery substance 12 can be any compressible, weather-resistant substance, which is capable of absorbing and redistributing the impact of the collision and protecting the body or the bumper 14 of the car from bumps and scratches. In the preferred embodiments, the layer of compressible rubbery substance 12 is comprised primarily of soft plastics (and particularly clear soft plastics) or artificial rubber, although other compressible materials may be used.

In the preferred embodiments, the layer of compressible rubbery substance 12 provides the basic shape and structure to each section 11. For example, in FIG. 3, the layer of compressible rubbery substance 12 is shaped in the form of the letter "A."

Each section 11 comprises, an attachment side 16, a face side 17 and a holder 18, intended for securing the at least one section 11 to the body of a vehicle.

The attachment side 16 refers to the side of the layer 12 that is parallel to and oriented toward the body or the bumper 14 of the vehicle, when the bumper protector 10 is attached to the vehicle. In most preferred embodiments, this is the side that is pressed flush against the vehicle.

A face side 17 refers to the side of the layer 12 that is opposite the attachment side, and is parallel to and oriented away from the body or the bumper 14 of the vehicle, when the bumper protector 10 is attached to the vehicle. In other words, this is the side that will be seen by observers looking at the attached bumper protector 10. Thus, this is the side that in preferred embodiments bears the most embellishments, advertisement information, and functional adaptations, as described below.

Each of the sections 11 may be attached to the vehicle body or bumper 14 with the holder 18. The term "holder" 18 as used in this specification and the claims is a broad term, referring to a broad variety of possible adaptations for attaching one or more sections 11 to the body or bumper 14 of the vehicle. In the preferred and simplest embodiment, the holder is a layer of glue on the attachment side of the section 11. For lightweight embodiments of the bumper protector 10 or for temporary attachment, the glue of the type commonly used in the peel-and-stick bumper stickers is preferred. For more permanent attachment, permanent super glues may be used. In another preferred embodiment (Shown in FIG. 1 and FIG. 2), the holder comprises one, or preferably three or more brackets 19, holding one or more sections 11 in place, attached to the vehicle. Such brackets may themselves be glued to the bumper 14, or screwed or bolted to the bumper 14, as shown in FIG. 1.

In the preferred embodiment of bumper protector 10, comprising the brackets 19, the brackets 19 can be rotated away to release the section 11. Alternatively, the brackets 19 can be positioned to support the section 11 on the sides and the bottom, but, preferably, not on the top, thus allowing the vehicle owner to slide up and remove the section 11. This allows for removal of the section 11 for cleaning or replacement.

The owner may want to replace the section 11 once it is worn, or to insert a different symbol. For example, the current invention foresees an embodiment where the bumper protector 10 consists of a phrase "I AM HAPPY TODAY." The word "HAPPY" is one of the several sections 11 of this bumper protector. The section may be removable, as described above, and replaceable by another section 11 from a set. For example, on a particular day, the owner may want to remove the section 11 that says "HAPPY" and replace it with a section 11 that says "SAD" to express personal feelings to the world. Alternatively the word "HAPPY" may be replaced by a smiley face or a sad face icon, or any other raised visually-recognizable symbol or part thereof.

In the preferred embodiment of the bumper protector 10, at least one section 11 is shaped in the form of a visually-recognizable symbol of a car manufacturer's brand, logo or trademark. Some examples of such marks include a circle, subdivided into four equal parts, two of which are dark (preferably blue) and two are white, for the BMW mark (see FIG. 2), or a circle subdivided into three equal parts for Mercedes Benz. Alternatively, such a car-manufacturer's mark can be expressed with a word, such as "BMW" or the name or number of the model of the vehicle.

In embodiments of the bumper protector 10, in the shape of a car-manufacturer's logo, the bright and unusual nature of the protector also helps instantly and definitively identify the make of the car for public in general as well as for law enforcement personnel. Such identification may, for example, be useful in locating a stolen vehicle or a vehicle lost on the parking lot, in hit and run cases, in police chases, and in generally communicating a message to the public. For example, someone who just purchased an expensive car may want to protect his car from scratches, and at the same time show off the make of his/her car by attaching an enlarged (for example, BMW) mark for everyone to see. In the case of a car-maker's brand protector, the message is that the person is driving an expensive foreign car, or that the person is proud to drive an American car. Car manufacturers may include or sell such trademark bumper protectors as optional accessories to the owners, while at the same time maintaining or strengthening their own brand recognition.

The bumper protector 10 can carry any message or mark. For example, some embodiments of the bumper 10 may be in the form of a famous cartoon character (such as Sponge-Bob—the bumper sponge), a license plate number, an advertisement slogan, a witty bumper-sticker-type remark, or any other character, mark, or a series of marks. Embodiments of the bumper protector 10, carrying party symbols, such as an elephant or a donkey, national symbols, such as a flag, a bold eagle, twin towers of the World Trade Center, POW flags and slogans such as "Support the Troops," etc. allow for expression of personal statements, traditionally associated with bumper stickers, while at the same time affording the utilitarian protection of a bumper protector.

In contrast to traditional bumper stickers, the bumper protector 10 stands out from the surface of the vehicle, allowing for a much more striking three-dimensional image or text. In the preferred embodiments of the bumper protector 10, where the layer 12 is comprised of compressible plastics, the message on the bumper protector 10 may be emphasized by differently-colored plastics. The letters or logos may be further emphasized with lights 24, built into the bumper protector 10. Alternatively, clear plastics may be used to blend some sections of the bumper protector 10 or the entire bumper protector 10 with the body of the vehicle.

Bumper protector 10 allows for a unique and highly effective method of advertisement, while at the same time protecting the body of the bumper from dents and scratches. Bumper protector 10 can be executed to present almost any logo or message in two or three dimensional form in any color pallette. Almost any kind of commercial, political, or other advertisements can be executed in any kind of color and materials, as long as a layer of compressible material is present on or underneath the face side 17.

The method of advertising and protecting the body of the vehicle, thus requires the presence of the bumper protector 10, as described above, where the face side 17 bears depiction of some advertising material such as text, trademark, or another graphical symbol. Such advertising material may, for example, be executed as one or more three dimensional figures (such as letters "AD" of FIG. 2) or one or more two-dimensional representations on the raised face side 17 (such as the BMW mark of FIG. 2), or any combination thereof. The attachment side 16 of the at least one section 11 of the vehicle body protector 10 must be rigidly secured to the body of the vehicle with the holder 18. In other words, the bumper protector 10 must be glued, fitted into the bracket 19 or otherwise rigidly attached to the body of the vehicle with holder 18. The term "rigidly" as used in the description and claims, refers to the kind of attachment that will not allow the bumper protector 10 to move or flap, like the rug-type bumper protectors during normal movement of the car.

Once the bumper protector 10 is attached to the vehicle, the vehicle must be positioned in view of the advertisement audience. Such positioning need not necessarily be intentional. That is, to constitute positioning in view of the advertisement audience, the vehicle may be left parked on the street, where pedestrians or passing drivers may see the message conveyed by the bumper protector 10. Alternatively normal driving on roads positions the bumper protector 10 in view of other drivers. In fact, the very nature of driving turns the driver of the car behind the one bearing the bumper protector into the captive audience. Such driver will be forced to look at the advertisement presented out of the necessity to look ahead while driving, thus consciously or subconsciously analyzing the ad. At the same time, looking at the advertisement ahead of him is unlikely to disturb the driver from the conditions on the road, as roadside billboard ads do. A raised message (be it flat or 3D) attached to the bumper of the car, idling in traffic, is also very likely (much more so than a flat bumper sticker) to be noticed and read, and discussed by the occupants of the car, directly behind it.

Very few opportunities exist for companies to advertise to such captive audiences, where the intended audience can not change the channel or flip a page to avoid looking at the ad. The value of such advertisement is thus likely to be very high for companies. The present invention thus foresees a method of advertisement, where companies provide special incentives to drivers of vehicles, carrying bumper protectors 10 with such company's mark or logo. For example, a gas station chain may give special discounts on gas to the cars bearing a bumper protector 10 with its logo.

The dual nature of the bumper protector 10—as advertising means and a bumper protector, will allow the companies to obtain goodwill by distributing such bumper protectors with their logo as gifts to members of the general public or company's customers for attachment to their cars. Customers will be happy to receive free bumper protectors. At the same time, customer's use of such logo-bearing bumper protectors 10 on their cars will provide free advertisement for the companies, bringing in additional goodwill and strengthening the value of company's trademarks.

Figure 3:
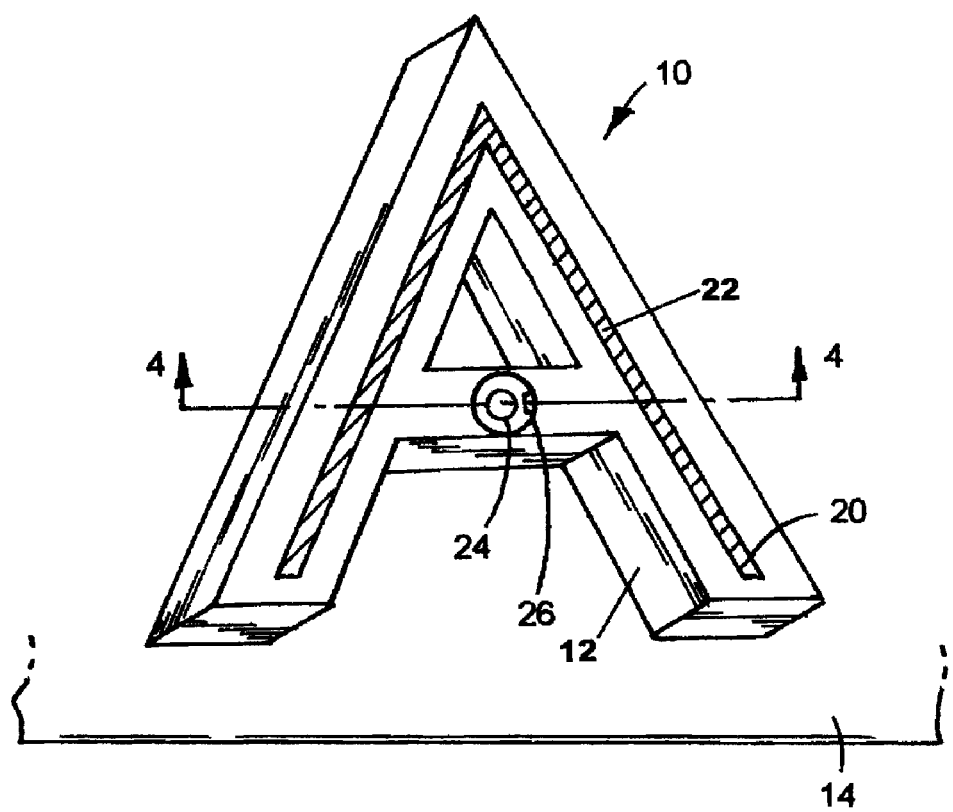
FIG. 3 depicts an embodiment of the vehicle body protector with various utilitarian adaptations (i.e. lamp, motion sensor, holographic/reflective tape, etc) built into the body of the bumper protector.
Figure 9:
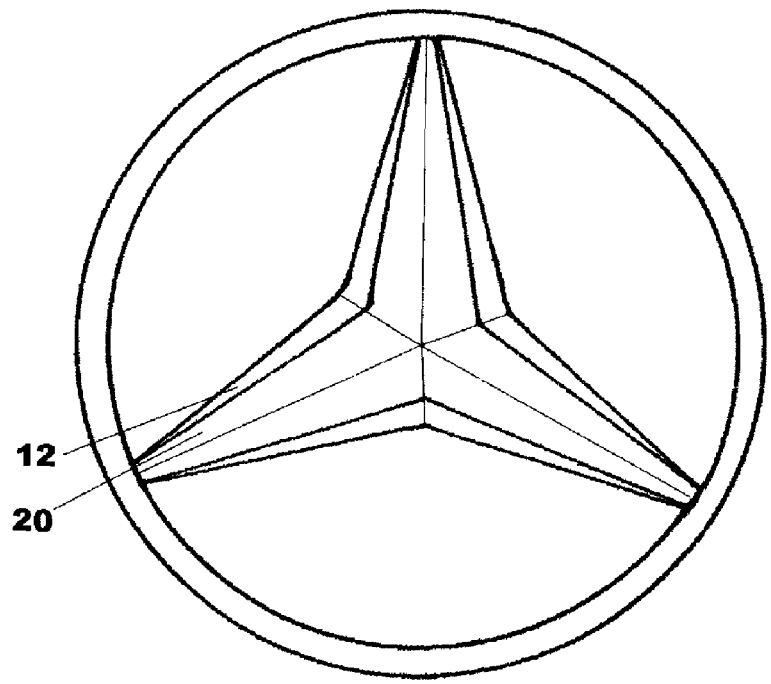
FIG. 9 depicts an embodiment of the vehicle body protector section in the form of the Mercedes Benz logo, with light-reflective materials attached to the face side of the section. (The MERCEDES BENZ symbol depicted on the drawing is a registered trademark of Daimler Chrysler AG Corporation).

For added safety, the preferred embodiments of the bumper protector 10, such as the ones shown on FIG. 3 and FIG. 9 comprises light-reflective materials 20 attached to some or all of the face side 17. In some embodiments, where the face side 17 is translucent, light-reflective materials may be positioned under the face side 17, so as to be visible through the face side 17. Light-reflective materials 20 will improve the visibility and emphasize the dimensions of the vehicle. In the preferred embodiment, the bumper protector 10 comprises one or more sections 11, comprising reflective materials (reflectors), said reflectors being similar to those found on the front and back of bicycles, except with soft outer surface to absorb bumps. The soft outer surface is preferably made of soft translucent rubbery material, which allows the reflective surface underneath to show through. Such sections 11, comprising reflectors are preferably positioned on the far edges (right and left edge) of the bumper to emphasize the width dimensions of the vehicle.

The reflectors themselves can be of simple (circular or rectangular) shape or of the shape of special characters or symbols and can be used in combination with the symbol-shaped parts of the bumper protector 10, or separately.

The versatile nature of the present invention allows various utilitarian adaptations to be built into the resilient body of the bumper protector 10. For example, some embodiments of the present invention, such as the embodiment shown on FIGS. 3 and 4, comprise a groove 22 running under the surface of the face side 17. Light reflective materials 20, such as holographic reflective tape 20A, can be positioned inside the groove 22. The groove thus protects light-reflective materials, such as the reflective tape 20A from physical wear. The reflective tape 20A plays a dual role of improving the visibility of the vehicle and of emphasizing the advertising message on the bumper protector 10.

Figure 4:
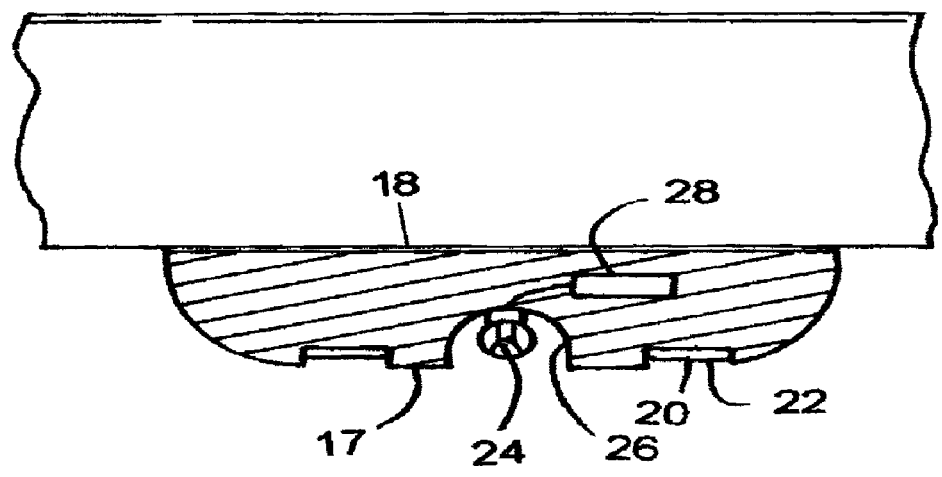
FIG. 4 depicts the embodiment of FIG. 3, cut along the line 4-4.
Figure 5:
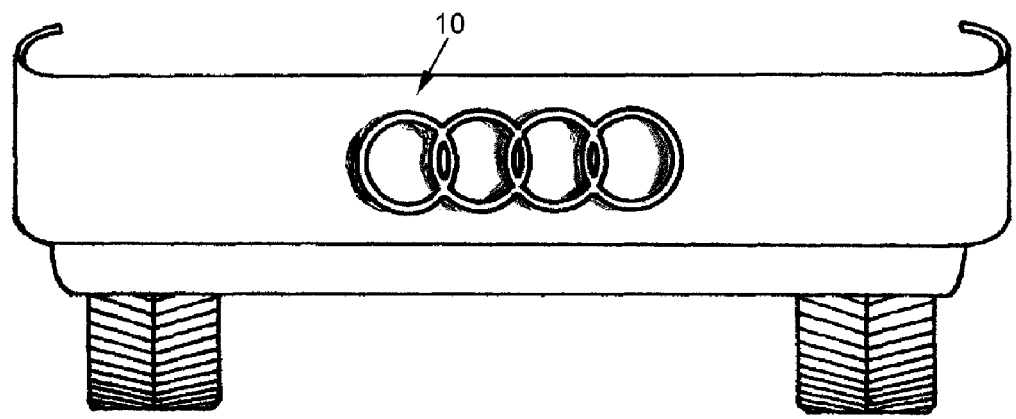
FIG. 5 depicts an embodiment of the vehicle body protector in the form of the Audi logo, attached to the bumper of a car. (The AUDI symbol depicted on the drawing is a registered trademark of AUDI A.G. CORPORATION, FED REP GERMANY)
Figure 6:
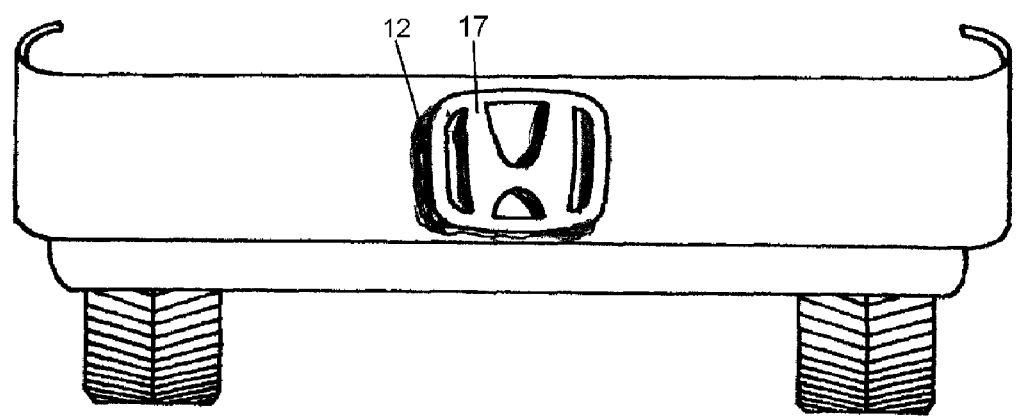
FIG. 6. depicts an embodiment of the vehicle body protector in the form of the Honda logo, attached to the bumper of a car (The HONDA symbol depicted on the drawing is a registered trademark of Honda Motor Co., Ltd. Joint-stock company JAPAN).
Figure 7:
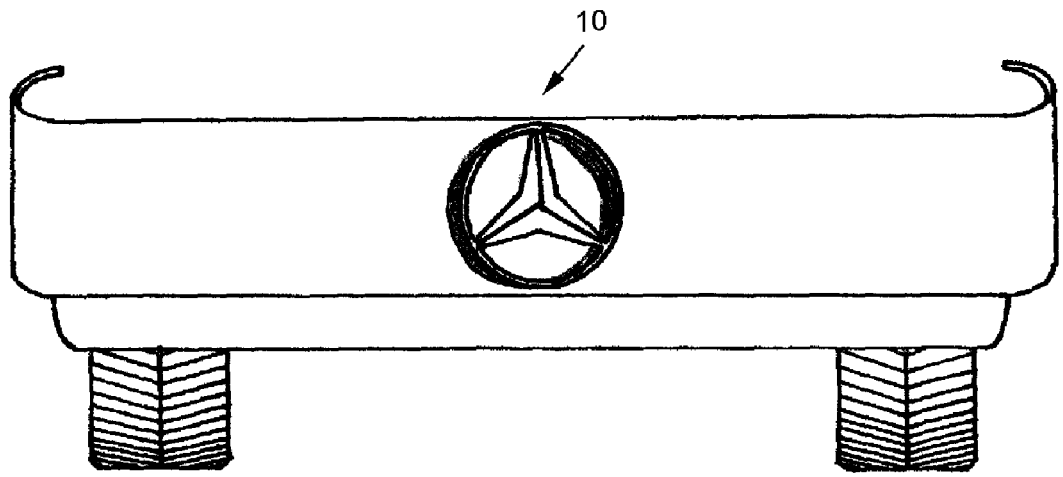
FIG. 7. depicts an embodiment of the vehicle body protector in the form of the Mercedes Benz logo, attached to the bumper of a car (The MERCEDES BENZ symbol depicted on the drawing is a registered trademark of Daimler Chrysler AG Corporation).
Figure 8:
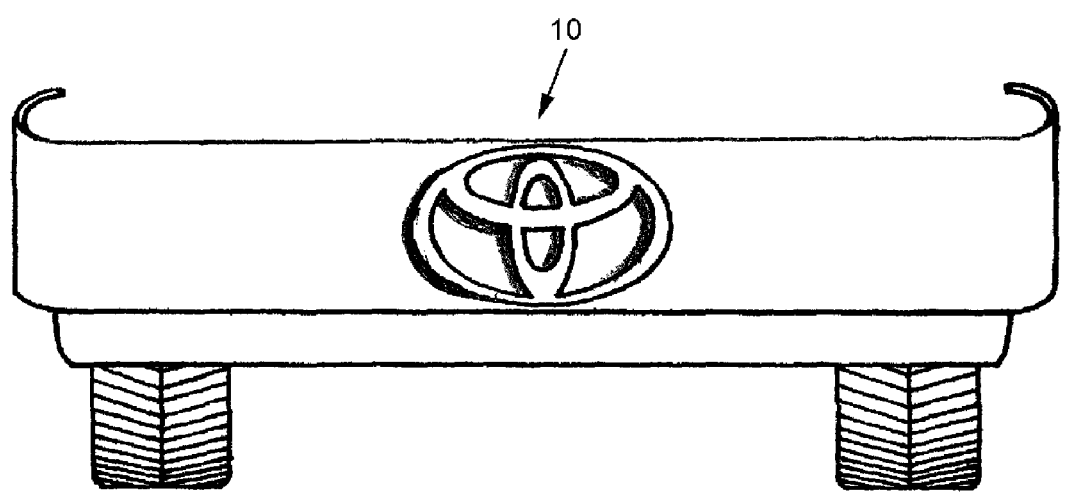
FIG. 8. depicts an embodiment of the vehicle body protector in the form of the Toyota logo, attached to the bumper of a car. (The TOYOTA symbol depicted on the drawing is a registered trademark of Toyota Jidosha Kabushiki Kaisha TA Toyota Motor Corporation of Japan).
Figure 10:
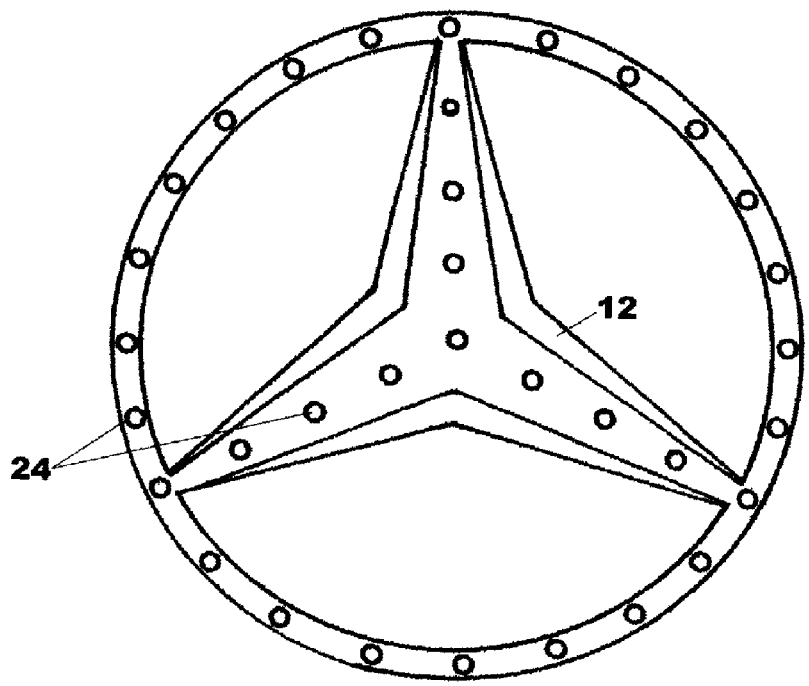
FIG. 10 depicts an embodiment of the vehicle body protector section in the form of the Mercedes Benz logo, comprising a plurality of lamps. (The MERCEDES BENZ symbol depicted on the drawing is a registered trademark of Daimler Chrysler AG Corporation).

Similarly, preferred embodiments of the invention, such as the embodiment on FIG. 3 and FIG. 4, and the embodiment on FIG. 10 comprise a lamp 24, the lamp 24 positioned under the surface of the face side 17. In preferred embodiment, the lamp 24 is a LED lamp, although incandescent and other types of lamps may be used. One or more lamps 24 may be "sunk" into the rubbery substance 12 (See FIG. 10). Such a lamp 24 or lamps 24 may provide additional illumination for the message on the protector, as well as for driving and parking. In preferred embodiments, where the rubbery substance is translucent or mostly translucent, the lamp 24 may be encased in and shine through the rubbery material from under the surface. In other embodiments, the lamps 24 may be positioned under the surface of the face side 17 and shine through the holes in the face side 17.

The light from the lamp in the bumper protector 10 can also be used to estimate the distance to the bumper of the next car. Since such lamp(s) are positioned on the bumper level, the light from the lamp will form circles on the bumper of the car ahead (or behind). The further the bumper protector lamp is from another car, the greater will the dissipation of the light ray be, and consequently, the larger will the circle be. Thus, the smaller the circle, the closer the bumper of another car is, and consequently, the greater is the precaution that should be taken. The lamp 24 may also be connected to the car's braking light, and serve as additional red braking light.

Alternatively, a digital camera and/or a distance sensor 26 can be "sunk" inside the layer 12 of the bumper protector. One of the preferred embodiments comprises both a distance meter and a digital camera. The distance meter and the digital camera are both positioned under the surface of the face side 17, with access to the environment through the holes in the face side 17. In other embodiments the digital camera may be positioned away from the bumper protector 10, such as on the rear view mirror of the car. The digital camera is activated by the distance meter (preferably through a remote control) to take a photograph or a video clip if any object approaches closer than a distance preset on the distance meter. Such function of the bumper protector 10 can be useful in obtaining evidence of road accidents and parking hit-and-run cases. The camera can also be used to convey images (wirelessly or through the wire) to the monitor of the car driver for parking assistance.

A distance sensor 26 can be combined with a beeping alarm or a lamp 24 (or both), which goes off, or, alternatively lights up, when distance to another car's bumper is short.

Numerous other utilitarian devices and combinations thereof can be built into the bumper protector 10. Such devices can be powered by a battery 28 built into the bumper protector, or powered by the systems of the car. To achieve the latter, the bumper protector 10 can be connected to a car battery by a cable, which can run to the bumper protector 10 from underneath the car, from under the hood, or through a small hole in the bumper, among other routes. Alternatively, the battery can be charged by the solar/light cells, built into the bumper protector 10. The solar/light cells on the bumper protector 10, will allow the battery to recharge, not only from sunlight, but also from the headlight beams emanating from other cars.

For use, the bumper protector is mounted on the front, rear or side of the vehicle.

The device is truly versatile, as it can adopted to perform the above-described and numerous other useful functions in addition to giving a peace of mind and reliable bumper protection to the car owner as well as an efficient advertising method.

It is to be understood that while the apparatus and method of this invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A vehicle body protector comprising:
   at least one section, said at least one section comprising:
   a face side, said face side having an outside perimeter surface,
   an attachment side,
   at least one layer of compressible rubbery substance,
   said at least one layer of compressible rubbery substance located on the face side of the at least one section;
   a holder, the holder intended for securing the at least one section to a body of a vehicle,
   wherein the holder is a layer of glue on the attachment side of the at least one section;
   wherein the at least one section is shaped in the form of a raised visually-recognizable symbol;
   with the outside perimeter surface of the face side of the vehicle body protector conforming to the shape of the raised visually-recognizable symbol;
   wherein the vehicle body protector is attached to an outer vehicle body panel;
   wherein the vehicle body protector is shorter in length than vehicle's width;
   and wherein the term "the body of a vehicle" refers to surface area of vehicle's bumpers.

2. The vehicle body protector of claim 1, wherein the holder comprises at least one bracket.

3. The vehicle body protector of claim 1, wherein the raised visually-recognizable symbol is a trademark of a company.

4. The vehicle body protector of claim 1, wherein the at least one section is shaped in the form of a raised visually-recognizable symbol of a car manufacturer's brand.

5. The vehicle body protector of claim 1, wherein the raised visually-recognizable symbol comprises at least one letter of an alphabet.

6. The vehicle body protector of claim 1, further comprising light-reflective materials attached to the face side of at least one of the at least one section.

7. The vehicle body protector of claim 6, further comprising a groove, on the face side, with light-reflective materials positioned inside of the groove, whereby the groove protects light-reflective materials from physical damage.

8. The vehicle body protector of claim 1, further comprising at least one lamp, the lamp positioned under the surface of the face side.

9. The vehicle body protector of claim 1, wherein the at least one section is a plurality of sections, wherein each section of the plurality of sections forms at least a part of the raised visually-recognizable symbol.

10. The vehicle body protector of claim 9, wherein at least some of the plurality of sections comprise light-reflective materials, said light-reflective materials positioned on the face side of the at least some of the plurality of sections.

11. The vehicle body protector of claim 10, wherein at least some of the sections that comprise light-reflective materials are positioned near the right and left edges of a bumper, so as to emphasize the width dimensions of the vehicle.

12. A method of advertising and simultaneously protecting a vehicle's bumper surface from bumps and scratches, the method comprising the steps of:
   a. Obtaining a vehicle body protector of the type comprising:
   at least one section, said at least one section comprising:
   a face side, said face side having an outside perimeter surface,
   an attachment side,
   at least one layer of compressible rubbery substance,
   said at least one layer of compressible rubbery substance located on the face side of the at least one section;
   a holder, the holder intended for securing the at least one section to a body of a vehicle,
   wherein the holder is a layer of glue on the attachment side of the at least one section;
   wherein the at least one section is shaped in the form of a raised visually-recognizable symbol;
   with the outside perimeter surface of the face side of the vehicle body protector conforming to the shape of the raised visually-recognizable symbol;
   wherein the vehicle body protector is attached to an outer vehicle body panel;
   wherein the vehicle body protector is shorter in length than vehicle's width;
   and wherein the term "the body of a vehicle" refers to surface area of vehicle's bumpers;
   wherein the face side of the at least one section bears at least some advertising content;
   b. rigidly securing the attachment side of the at least one section of the vehicle body protector to the body of the vehicle using the holder;
   c. positioning the vehicle with attached vehicle body protector in view of the advertisement audience.

13. Method of advertising, the method comprising the steps of
  a. Obtaining a vehicle body protector of the type comprising:
  at least one section, said at least one section comprising:
  a face side, said face side having an outside perimeter surface,
  an attachment side,
  at least one layer of compressible rubbery substance,
  said at least one layer of compressible rubbery substance located on the face side of the at least one section;
  a holder, the holder intended for securing the at least one section to a body of a vehicle,
  wherein the holder is a layer of glue on the attachment side of the at least one section;
  wherein the at least one section is shaped in the form of a raised visually-recognizable symbol;
  with the outside perimeter surface of the face side of the vehicle body protector conforming to the shape of the raised visually-recognizable symbol;
  wherein the vehicle body protector is attached to an outer vehicle body panel;
  wherein the vehicle body protector is shorter in length than vehicle's width;
  and wherein the term "the body of a vehicle" refers to surface area of vehicle's bumpers;
  wherein the face side of at least one of the at least one section comprises an advertising image;
  b. distributing of the vehicle protector to members of the public, thereby promoting goodwill and advertising the company.

* * * * *